United States Patent [19]

Copenhafer et al.

[11] Patent Number: 4,652,054
[45] Date of Patent: Mar. 24, 1987

[54] SOLUTION MINING OF TRONA OR NAHCOLITE ORE WITH ELECTRODIALYTICALLY-PRODUCED AQUEOUS SODIUM HYDROXIDE

[75] Inventors: William C. Copenhafer, Yardley, Pa.; Henry A. Pfeffer, III, Mercerville, N.J.

[73] Assignee: Intermountain Research & Development Corporation, Green River, Wyo.

[21] Appl. No.: 723,679

[22] Filed: Apr. 16, 1985

[51] Int. Cl.$^4$ .................... E21C 41/08; E21B 43/28
[52] U.S. Cl. .................... 299/5; 204/182.5; 423/206 T; 423/421
[58] Field of Search .......... 204/182.4, 182.5; 423/206 T, 421; 210/748; 299/5

[56] References Cited

U.S. PATENT DOCUMENTS

| 3,184,287 | 5/1965 | Gancy | 423/198 |
| 3,953,073 | 4/1976 | Kube | 299/4 |
| 4,107,015 | 8/1978 | Chlanda et al. | 204/182.4 |
| 4,116,889 | 9/1978 | Chlanda et al. | 204/182.4 X |
| 4,219,396 | 8/1980 | Gancy et al. | 204/180 |
| 4,238,305 | 12/1980 | Gancy et al. | 204/180 |
| 4,391,680 | 7/1983 | Mani et al. | 204/98 |
| 4,498,706 | 2/1985 | Ilardi et al. | 299/5 |
| 4,584,077 | 4/1986 | Chlanda et al. | 204/182.4 |

FOREIGN PATENT DOCUMENTS 121611 10/1984 European Pat. Off. .

Primary Examiner—G. L. Kaplan
Attorney, Agent, or Firm—Christopher Egolf

[57] ABSTRACT

A cyclic solution mining method that uses aqueous sodium hydroxide for recovering valuable alkali values, preferably as soda ash, from subterranean deposits of trona or nahcolite, even when such deposits are NaCl-contaminated. The aqueous sodium hydroxide mining solvent is generated via electrodialysis of a recirculating sodium chloride brine stream. Hydrogen chloride that is also generated in the cell's operation is neutralized with aqueous sodium carbonate, to regenerate sodium chloride brine that is recirculated to the electrodialysis cell as brine feed.

15 Claims, 2 Drawing Figures

SOLUTION MINING OF TRONA OR NAHCOLITE ORE WITH ELECTRODIALYTICALLY-PRODUCED AQUEOUS SODIUM HYDROXIDE

BACKGROUND OF THE INVENTION

1. Field of the Invention

This invention relates to the solution mining of subterranean trona and/or nahcolite ore deposits with an aqueous sodium hydroxide solvent that is generated electrodialytically.

2. Description of the Prior Art

The use of aqueous sodium hydroxide (NaOH) for solution mining of subterranean trona ore and nahcolite ore deposits is known. U.S. Pat. No. 3,184,287 issued to Gancy describes a cyclic process for solution mining trona with aqueous sodium hydroxide, this solvent being regenerated by causticization of aqueous sodium carbonate with lime. U.S. Pat. No. 3,953,073 issued to Kube describes the use of aqueous sodium hydroxide for solution mining of trona and nahcolite, and of other $NaHCO_3$-containing ores, and discloses that the solvent requirements may be met either by causticization of soda ash with hydrated lime or by the electrolytic conversion of sodium chloride to sodium hydroxide.

Aqueous sodium hydroxide that is produced by the electrolysis of aqueous sodium chloride brines also results in the coproduction of chlorine gas and hydrogen gas, which must be disposed of or otherwise utilized. Electrodialysis of such aqueous brines, in a cell having permselective bipolar membranes, likewise produces aqueous sodium hydroxide, but with hydrogen chloride as a coproduct. An important advantage of electrodialysis over electrolysis is that the energy requirements for electrodialytically-generated sodium hydroxide is much less than that of electrolytically-generated sodium hydroxide.

U.S. Pat. No. 4,219,396 issued to Gancy et al. describes the operation of an electrodialysis cell in which soda ash is recovered using a brine feed. Aqueous sodium chloride is introduced as feed brine to a salt zone of the three-zone electrodialysis cell, aqueous hydrogen chloride is removed from an acid zone, and NaOH-enriched aqueous sodium carbonate is withdrawn from a base zone and carbonated with $CO_2$ to convert the sodium hydroxide to sodium carbonate.

U.S. Pat. No. 4,391,680 issued to Mani et al. describes the operation of a two-compartment electrodialysis cell in which an aqueous brine feed is introduced into the first compartment. An acidified salt solution, containing HCl, is withdrawn from the first compartment for use as feed to an electrolytic cell, and aqueous sodium hydroxide is withdrawn from the second compartment.

U.S. Pat. No. 4,498,706 issued to Ilardi et al. for "Solution Mining of Trona or Nahcolite Ore with Aqueous NaOH and HCl Solvents," teaches the use of electrodialysis cell coproducts, hydrogen chloride and sodium hydroxide, as separate aqueous solvents in an integrated solution mining process for recovering soda ash. The electrodialytically-produced aqueous sodium hydroxide is utilized as the primary solution mining solvent and the co-produced aqueous hydrogen chloride is used to solution-mine NaCl-contaminated ore deposits to recover a brine feed for the electrodialysis cell operation.

Aqueous hydrogen chloride possesses some drawbacks as a solution mining solvent, which discourage its use in this application. The fact that aqueous hydrogen chloride is a strong acid may create environmental objections against its use in a subterranean ore deposit; complete neutralization of the residual acid, following the termination of solution mining activity, would be difficult and costly. Reaction of the hydrogen chloride solvent with the $NaHCO_3$-containing ore converts the ore's valuable alkali values into less desirable sodium chloride.

The solution mining method of the present invention avoids these drawbacks while nevertheless employing an electrodialysis cell to produce aqueous sodium hydroxide solvent. Aqueous sodium hydroxide is the sole mining solvent contacted with the underground ore deposits. Aqueous hydrogen chloride, coproduced in the electrodialysis cell, is not recovered but is instead completely reused in the electrodialysis cell operation so that it plays no role in the solution mining of the subterranean ore deposits.

SUMMARY OF THE INVENTION

In accordance with the present invention, subterranean ore deposits of trona or nahcolite are solution mined in a cyclic method which includes the steps of (i) contacting a subterranean trona or nahcolite ore deposit with aqueous sodium hydroxide solvent, prepared from electrodialysis of a brine, to form aqueous sodium carbonate;

(ii) withdrawing aqueous sodium carbonate mining solution from the region of the ore deposit, whereby soda ash may be recovered from the withdrawn mining solution;

(iii) preparing aqueous sodium hydroxide solvent by electrodialyzing a recirculating aqueous sodium chloride brine stream in an electrodialysis cell to yield aqueous cell effluents containing sodium hydroxide, hydrogen chloride and depleted sodium chloride brine;

(iv) employing the aqueous sodium hydroxide cell effluent as aqueous sodium hydroxide solvent for solution mining of the subterranean ore deposit;

(v) neutralizing the aqueous hydrogen chloride cell effluent with aqueous sodium carbonate; and (vi) introducing the neutralized aqueous hydrogen chloride, along with the depleted aqueous sodium chloride cell effluent brine, into the electrodialysis cell, thereby providing for substantially complete recycle of the aqueous chloride in the operation of the electrodialysis cell.

The electrodialysis cell is preferably a plurality of unit cells, with each unit preferably containing an acid zone, a salt zone and a base zone. Aqueous sodium hydroxide and aqueous hydrogen chloride are withdrawn from the base and acid zones, respectively; the recirculating brine stream is introduced into the salt zone.

A preferred embodiment of the invention involves solution mining of subterranean trona ore deposits, by an integrated cyclic method which includes the steps of (i) contacting a subterranean trona ore deposit with aqueous sodium hydroxide solvent, prepared from electrodialysis of a brine, to form aqueous sodium carbonate;

(ii) withdrawing aqueous sodium carbonate mining solution from the region of the ore deposit;

(iii) recovering soda ash from the withdrawn mining solution by evaporative crystallization of sodium carbonate monohydrate;

(iv) preparing aqueous sodium hydroxide solvent by electrodialyzing a recirculating aqueous brine stream, in an electrodialysis cell having three zones per cell unit, to yield, as cell effluents, aqueous sodium hydroxide, aqueous hydrogen chloride, and an aqueous brine stream depleted in sodium chloride;

(v) employing the aqueous sodium hydroxide cell effluent as aqueous sodium hydroxide solvent for solution mining of the subterranean ore deposit;

(vi) neutralizing the aqueous hydrogen chloride cell effluent with aqueous sodium carbonate liquor diverted from the crystallization operation of the soda ash recovery;

(vii) introducing the neutralized aqueous hydrogen chloride, along with the depleted aqueous sodium chloride brine stream, into the electrodialysis cell, thereby providing for substantially complete recycle of the aqueous chloride in the operation of the electrodialysis cell; and (viii) discarding a portion of neutralized hydrogen chloride or depleted sodium chloride brine as necessary, as purge, prior to their reintroduction into the electrodialysis cell, to maintain the concentrations of sodium chloride and anionic impurities in the recirculating brine stream at relatively constant values.

It is important to note that all of the solution mining methods embodying this invention are closed loop processes that provide for complete recycle of chloride in the operation of the electrodialysis cell. Any additional sodium chloride introduced to the loop via neutralization of the hydrogen chloride with NaCl-contaminated aqueous sodium carbonate is readily removed as a purge stream, with no loss of valuable alkali in the discarded purge.

BRIEF DESCRIPTION OF THE DRAWINGS

The drawing in FIG. 1 illustrates a schematic flow diagram for one embodiment of the invention in which a subterranean trona ore deposit is solution mined with electrodialytically-prepared aqueous sodium hydroxide in a three zone cell and soda ash is recovered from the withdrawn mining solution.

The drawing in FIG. 2 illustrates a two zone electrodialysis cell, which may be substituted for the three zone cell employed in the process of FIG. 1.

DETAILED DESCRIPTION

Figure 1:
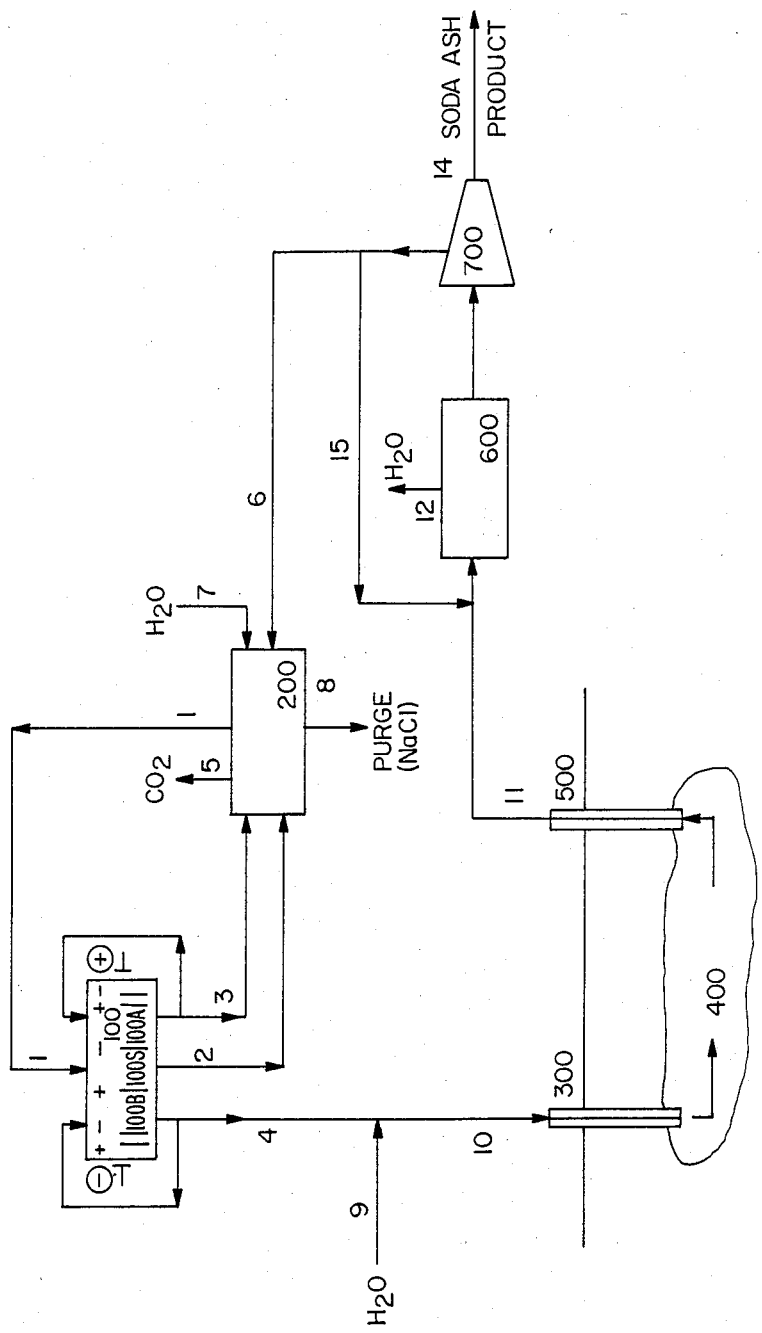

The subterranean deposits of $NaHCO_3$-containing ore that are treated in this invention may be trona (crude $Na_2CO_3 \cdot NaHCO_3 \cdot 2H_2O$) or nahcolite (crude $NaHCO_3$) or combinations of these ores. Trona is the preferred type of $NaHCO_3$-containing ore utilized in the method of this invention. The trona ore deposit may contain varying amounts of nahcolite without adverse effect on the solution mining method of the invention.

Multiple trona or nahcolite beds in a single region may be solution mined in this invention. There is no requirement that mining be limited to a single bed or stratum of ore. It should therefore be understood that references to an ore deposit include the option of simultaneously or concurrently mining several ore beds by the method of this invention.

The solution mining method of this invention is particularly well suited for use with ore deposits that contain sodium chloride as a contaminant (e.g., at least 0.5 wt % NaCl), even in substantial amounts (e.g., more than 5 wt % NaCl). Low-NaCl and NaCl-contaminated trona or nahcolite beds are often located in close proximity, in strata, and confinement of the solution mining cavity to a single bed may not be feasible. This fact makes the solution mining method of this invention especially appropriate for the efficient recovery of available ore reserves in a single geographic region, despite salt contamination of some ore beds.

In the cyclic solution mining method of this invention, the aqueous sodium hydroxide solvent is contacted with the ore deposit using conventional solution mining procedures. Such solution mining procedures are well-described in U.S. Pat. No. 3,184,287 issued to Gancy, which is hereby incorporated by reference. Its procedures are applicable not only to solution mining of trona but also of nahcolite.

The aqueous sodium hydroxide solvent preferably contains from 1–15 wt. % NaOH, more preferably from 1–10 wt. % NaOH, and most preferably from 3–10 wt. % NaOH.

The aqueous sodium carbonate solution that is withdrawn from the region of the ore deposit is utilized for its alkali values. This solution typically contains from 15–30 wt % $Na_2CO_3$. Such aqueous sodium carbonate is desirably substantially free of sodium chloride and sodium sulfate, i.e., containing less than 1 wt % NaCl and 1 wt % $Na_2SO_4$, to facilitate efficient recovery of its alkali values as soda ash. But, as mentioned above, the solution mining method of this invention is readily adapted for use with aqueous sodium carbonate solutions that are contaminated with sodium chloride.

The withdrawn sodium carbonate solution is desirably processed to recover soda ash. The procedures described in the previously-mentioned Gancy '287 patent may be employed to recover soda ash from such solution, as sodium carbonate monohydrate or anhydrous sodium carbonate, the former being preferred.

The solution mining method of this invention requires an electrodialysis cell for the production of the aqueous sodium hydroxide mining solvent.

A preferred type of electrodialysis cell for use in this invention has three zones or compartments: an acid zone, a salt zone, and a base zone. A single electrodialysis cell ordinarily consists of multiple, repeating units of these three zones and is sometimes called a cell stack.

The electrodialysis cell zones are separated by anion-permeable (or permselective), cation-permeable, and bipolar membranes. The bipolar membranes allow water to be split into acid, i.e. hydronium, ($H^+$) ions and hydroxyl ($OH^-$) ions, which migrate into the acid and base zones, respectively. The bipolar membranes ordinarily separate adjacent acid and base zones in a three-zone cell stack.

In the three zone electrodialysis cell, brine feed solution is electrodialyzed into aqueous hydrogen chloride which is removed from the acid zone, and aqueous sodium hydroxide which is removed from the base zone. A depleted brine solution is withdrawn from the brine zone.

The acid zone is bounded by an anion-permeable membrane on the cathodic side and the acid-generating face of a bipolar membrane on the anodic side. The base zone is bounded by a cation-permeable membrane on its anodic side, and the base-generating face of a bipolar membrane on its cathodic side. The salt zone is between the acid and base zones, being bounded by an anion-permeable membrane on its anodic side and a cation-permeable membrane on its cathodic side.

The three zone cell arrangement is preferred over the two zone cell described below because it produces more concentrated acid and base solutions at higher current efficiencies. Hydronium ion back-migration across the anion-permeable membrane and hydroxyl ion back-migration across the cation-permeable membrane must be minimized to yield high current efficiencies.

A second type of electrodialysis cell suitable for use in the method of this invention contains two zones, separated by cation-permeable and bipolar membranes. Aqueous sodium chloride brine is introduced into the first zone, and a depleted salt solution acidified with hydrogen chloride is withdrawn from the same zone. Aqueous sodium hydroxide is withdrawn from the second, base zone. High acid concentrations yield lower current efficiencies due to hydronium ion migration across the cation-permeable membrane into the base zone, resulting in their neutralization.

The operation of the electrodialysis cells described in U.S. Pat. No. 4,219,396 issued to Gancy et al. and in U.S. Pat. No. 4,391,680 issued to Mani et al. is similar in several respects to the electrodialysis procedures that may be utilized in this invention. For this reason, U.S. Pat. No. 4,219,396 and No. 4,391,680 are hereby incorporated by reference. It should be understood, however, that the treatment and use of the cell effluent streams (NaOH, HCl, depleted brine) are significantly different in this invention from that described in the referenced patents.

In the Gancy '396 electrodialysis operation, aqueous hydrogen chloride is withdrawn from the acid zone of the three zone cell. The subsequent neutralization of hydrogen chloride with lime or limestone to make calcium chloride, as described by Gancy, is deliberately avoided in the present invention. In the present method, aqueous hydrogen chloride from the electrodialysis cell is completely recycled, after neutralization with aqueous sodium carbonate, and reused as brine feed to the electrodialysis cell.

The mining solvent employed in the present invention is aqueous sodium hydroxide, and consequently the cell operation described by Gancy et al. '396 is simplified to remove only aqueous NaOH from the base zone. This is accomplished by not carbonating the NaOH-enriched stream removed from the base zone, because the carbonation specified by Gancy has the effect of neutralizing the NaOH-content of the effluent stream.

The aqueous base zone effluent, typically containing 5-10 wt % NaOH, is utilized directly as the aqueous NaOH-containing solvent for solution mining in this invention. The aqueous NaOH concentration may be varied beyond these limits by adjustment of cell operating parameters. Solution introduced to the base zone may be water, or aqueous sodium hydroxide or aqueous sodium carbonate, to which the necessary make-up water is added.

The second electrodialysis patent incorporated by reference, U.S. Pat. No. 4,391,680 issued to Mani et al., differs from the Gancy et al. '396 three-zone cell in that it describes the operation of a two-zone cell.

In the solution mining method of the present invention, the aqueous hydrogen chloride cell byproduct may contain sodium chloride since this acid byproduct is in any event neutralized, to form sodium chloride, before being recycled to the cell.

In the solution mining method of the present invention, the electrodialysis cell serves primarily to generate aqueous sodium hydroxide, for use as a mining solvent. The electrodialysis cell is operated with a recirculating brine stream, in which the hydrogen chloride cell byproduct is employed as an integral part.

The aqueous hydrogen chloride cell byproduct is neutralized to regenerate aqueous sodium chloride brine, for recycle as feed to the electrodialysis cell. Depleted brine from the electrodialysis cell is likewise recycled for use as cell brine feed. Both of these streams are typically combined, either before or after the neutralization step, to produce a refortified, regenerated sodium chloride brine.

It should be evident that only the three-zone electrodialysis cell yields separate output streams of depleted brine and aqueous hydrogen chloride. A two-zone cell, as mentioned earlier, produces a combined stream of acidified (HCl-containing) depleted brine. This difference has no significant impact on the neutralization of the hydrogen chloride and recycle of regenerated sodium chloride brine to the cell.

In the method of this invention, all of the chloride withdrawn or recovered from the electrodialysis cell, as depleted brine or as hydrogen chloride, is ultimately recycled to the cell. There is no net production, i.e., withdrawal or removal, of chloride from this recirculating brine stream.

The acidic portion of the recycled brine stream, i.e., hydrogen chloride, is neutralized with aqueous sodium carbonate. The neutralization step does not require any extraordinary procedures, other than those normally employed when a gaseous byproduct is evolved as part of the neutralization. The neutralization may be carried out in conventional tanks or other similar apparatus. The $CO_2$ byproduct from the neutralization may simply be vented but is more preferably recovered as a relatively pure gas.

The source of the aqueous sodium carbonate is not critical. It can be aqueous solution mining liquor, recovered from treatment of the $NaHCO_3$-ore with sodium hydroxide solvent; only a portion of such withdrawn solution mining liquor need be diverted for the neutralization step.

A preferred source of aqueous sodium carbonate is from a soda ash recovery plant, which is preferably integrated with the solution mining method. Aqueous sodium carbonate streams that are especially useful in the neutralization of the hydrogen chloride are those diverted or obtained from the soda ash crystallization step: feed solution introduced to the crystallizer(s) (in which soda ash is crystallized) and/or purge liquor from the crystallizer(s). The purge stream is typically mother liquor, remaining behind after separation of the product crystals from the crystallization slurry; this liquor usually is high in dissolved impurities, like NaCl and organics, which have become concentrated in the liquor. Because such purge liquor also contains an appreciable concentration of dissolved sodium carbonate, it desirably is used in the neutralization procedure, which allows its alkali values to be recovered rather than simply discarded.

Chloride (e.g., as NaCl) and other anionic impurities (e.g., sulfates, borates) that become introduced via the aqueous sodium carbonate used in the neutralization step must be purged from the neutralized brine, to prevent the accumulation of chloride and other anionic impurities in the closed loop electrodialysis cell operation. This chloride/anionic impurities balance is conveniently accomplished by purging and discarding a portion of the recirculating brine, either continuously or periodically.

This brine purge, it should be noted, results in minimal valuable alkali (Na$_2$CO$_3$) being lost, since only (sodium) chloride brine and anionic impurities are being discarded. The purge liquor is essentially all sodium chloride and its purge rate is adjusted to remove any (chloride) impurities in the NaCl-containing sodium carbonate used in the HCl neutralization. For this reason, the method of this invention is readily adapted to mining of NaCl-contaminated ore deposits, since the withdrawn NaCl-contaminated sodium carbonate solution presents no problems when used in the neutralization step.

The recycled aqueous brine that is fed to the electrodialysis cell preferably contains from 2–30 wt % NaCl (or up to a saturation concentration of NaCl) and more preferably from 5–20 wt % NaCl. The recycled brine is desirably substantially free of sodium carbonate; controlled, complete neutralization of the hydrogen chloride in the recirculating stream ensures that no residual sodium carbonate is present. The aqueous sodium chloride brine fed to the cell is preferably maintained at a slightly acidic pH, which minimizes the likelihood of solids precipitation within the cell compartments.

While not mentioned specifically, it should be apparent that make-up water will be required in this closed loop solution mining procedure; it may conveniently be added during the neutralization step and/or as aqueous feed to the electrodialysis cell compartments. The latter procedure permits more precise control of the chemical concentrations being maintained in the electrodialysis cell compartments.

EXAMPLE

The Example illustrates the cyclic solution mining method of this invention in a preferred embodiment for recovering soda ash from a subterranean trona ore deposit contaminated with some sodium chloride. Sodium carbonate monohydrate is recovered via evaporative crystallization from the withdrawn aqueous sodium carbonate mining solution.

A three-compartment electrodialysis cell is used to generate the aqueous sodium hydroxide mining solvent from the aqueous sodium chloride brine fed to the cell.

Neutralization of the aqueous chloride from the acid zone of the cell is accomplished with aqueous sodium carbonate mother liquor that remains after recovery of the crystallized sodium carbonate monohydrate.

In the detailed description that follows, reference is made to the drawing in FIG. 1 which shows a schematic flow diagram of the integrated cyclic solution mining method of this Example. The material balance (flow) quantities specified are those required to yield 2000 lb/hr (1 ton/hr) soda ash (as Na$_2$CO$_3$).

Aqueous sodium chloride brine 1 containing 10 wt % NaCl is continuously introduced into the zone of a three compartment electrodialysis cell 100. The salt zone 100S is the middle zone, located between the acid zone 100A on the anode (+) side and the base zone 100B on the cathode (−) side.

The acid zone 100A is bounded by a bipolar membrane on the anode side and by an anion-permeable membrane on the cathode side, adjacent to the salt zone 100S. The base zone 100B is bounded by a bipolar membrane on the cathode side and by a cation-permeable membrane on the anode side, adjacent to the salt zone 100S.

Although not shown in the drawing, the cell actually consists of multiple units of the three compartments, each unit being separated by a bipolar membrane.

A depleted brine stream 2 is continuously withdrawn from the salt zone 100S, for recycle as described below. An acid stream 3 containing aqueous hydrogen chloride is likewise continuously withdrawn from the acid zone 100A, for recycle in a similar manner as with the depleted brine stream 2. A portion of the withdrawn acid stream is returned directly to the cell for reintroduction to the acid zone 100A, as shown in the drawing.

A third stream 4 withdrawn from the cell 100 is removed from the base zone 100B and is aqueous sodium hydroxide containing about 7.8 wt % NaOH. A portion of the withdrawn caustic stream is returned directly to the cell for reintroduction to the base zone 100B, as shown in the drawing. The alkaline stream 4 is employed as aqueous sodium hydroxide solvent for solution mining of subterranean trona beds (as described below).

In the continuous operation of the electrodialysis cell 100 to produce aqueous sodium hydroxide 4, the depleted brine stream 2 and aqueous hydrogen chloride stream 3 are both introduced into a reactor 200 designed for neutralizing the acid component, HCl, of the latter stream with aqueous sodium carbonate.

Aqueous sodium carbonate 6, containing 27.6 wt % Na$_2$CO$_3$ and 3.4 wt % NaCl, is fed into reactor 200 at a rate of 3844 lb/hr to neutralize the HCl present in stream 3. The aqueous sodium carbonate 6 is a purge stream from the sodium carbonate monohydrate crystallizer (described below). The neutralization reaction is exothermic and liberates carbon dioxide gas 5 which is recovered from the reactor 200. Cooling to remove the neutralization exotherm is accomplished by conventional heat exchange means.

Make-up water 7 is added to the reactor 200 at a rate of 7785 lb/hr. The amount of make-up water added at this point affects the concentration of the recirculating brine stream 1 and of the sodium chloride purge stream 8; a reduction in the amount of make-up water would increase the sodium chloride concentration in these streams. The balance of the make-up water can be introduced into the electrodialysis cell zones and/or into the aqueous sodium hydroxide stream withdrawn from the base zone of the cell.

A purge stream 8 containing 10 wt % NaCl is removed from the reactor 200 at a rate of 1301 lb/hr and is discarded. This sodium chloride purge 8 removes precisely that amount of sodium chloride (130 lb/hr NaCl) which is introduced into the reactor 200 via the aqueous sodium carbonate stream 6, used to neutralize the recycled hydrogen chloride 3.

It is particularly noteworthy that the purge stream 8, unlike purges in other prior art solution mining schemes, contains only sodium chloride and does not contain any of the valuable alkali product, sodium carbonate. It is interesting to note also that if the ore being solution mined were NaCl-free, then no purge would be required; in such a case, there would be no net addition of sodium chloride via the aqueous sodium carbonate employed to neutralize hydrogen chloride.

The major effluent stream from the reactor 200 is aqueous sodium chloride brine 1, containing 10 wt % NaCl and no hydrogen chloride (the same composition as purge stream 8), and this stream 1 is recycled as a brine feed stream 1 to the electrodialysis cell 100.

It can be seen that with the exception of the brine purge (stream 8) the only product withdrawn from the electrodialysis cell is aqueous sodium hydroxide 4, which is employed in the solution mining of trona ore to recover soda ash product 14. All the acid chloride byproduct (HCl) in stream 3 from the cell operation is recycled, after its neutralization, and becomes reused as part of the brine feed 1 to the cell, so no unwanted chloride byproducts need be disposed of in this method.

As mentioned above, the aqueous sodium hydroxide stream 4 is used as the mining solvent. Sufficient water 9 is added to the aqueous sodium hydroxide stream 4, for water balance purposes, to yield aqueous mining solvent 10 containing 7.1 wt % NaOH. Mining solvent 10 containing 7.1 wt % NaOH is introduced at a rate of 11,239 lb/hr via injection well 300 into the region of a subterranean trona ore deposit.

The soluble portion of trona ore deposit in this Example contains 83% $Na_2CO_3 \cdot NaHCO_3 \cdot 2H_2O$ (sodium sesquicarbonate), 13 wt % $NaHCO_3$ (nahcolite), and a moderate level of salt, 4 wt % NaCl.

The cavity 400 is produced by dissolution of trona ore from the action of the aqueous solvent. As the soluble solid components of the ore become dissolved, such solids are replaced by aqueous mining solution which remains behind in the cavity 400 and which constitutes a loss of mining solution. This cavity loss of aqueous mining solution amounts to 2322 lb/hr, after dissolution of 3839 lb/hr ore.

Aqueous mining effluent solution 11 is withdrawn from the cavity 400 via withdrawal well 500, at a rate of 12,756 lb/hr. The aqueous sodium carbonate mining solution 11 is contaminated with salt and has a composition of 24 wt % $Na_2CO_3$ and 1.0 wt % NaCl. It should be recalled that the aqueous sodium hydroxide solvent 10 introduced to the cavity is essentially NaCl-free in this Example.

This contrasts with prior art solution mining methods like that of Gancy '287 where a NaCl-containing solvent is inevitable, even with low NaCl trona deposits, since the salt concentration in the recirculating solvent and recovered solution accumulates to appreciable levels (in excess of 1% NaCl) over long periods of continuous operation and therefore limits the recovery efficiency of the soda ash crystallization step.

The withdrawn aqueous mining solution 11 is introduced into a conventional evaporative crystallizer 600, to crystallize sodium carbonate monohydrate from the solution 11 by evaporation of water 12. This water 12 may also be used to supply most of the water requirements for the reaction 200, via stream 7, but this is not shown in the drawing.

The crystallizer slurry 13 removed from the crystallizer is piped to a centrifuge 700, or other solids/liquid separation device, to recover soda ash product 14. The recovered soda ash product 14 is sodium carbonate monohydrate ($Na_2CO_3 \cdot H_2O$), which is produced at a rate of 2000 lb/hr, and this is desirably dried (not shown in drawing) to make dense soda ash ($Na_2CO_3$). A portion 15 of the mother liquor from the solids separation is recycled to the crystallizer 600, to maintain the desired slurry density in the crystallizer.

The balance of the mother liquor 6 from the solids separation step is employed, as described above, as a feed stream to the reactor 200 where it serves to neutralize the hydrogen chloride stream 3 from the electrodialysis cell 100. In this manner, the solution mining cyclic loop is completely closed, aside from the soda ash product 14, only the sodium chloride purge 8 and carbon dioxide 5 from the neutralization reactor 200 are removed from the cyclic loop. Because the sodium chloride purge 8 is relatively small and contains no valuable alkali product, the solution mining process of this invention produces soda ash from the NaCl-contaminated ore deposit in a highly efficient manner.

Figure 2:
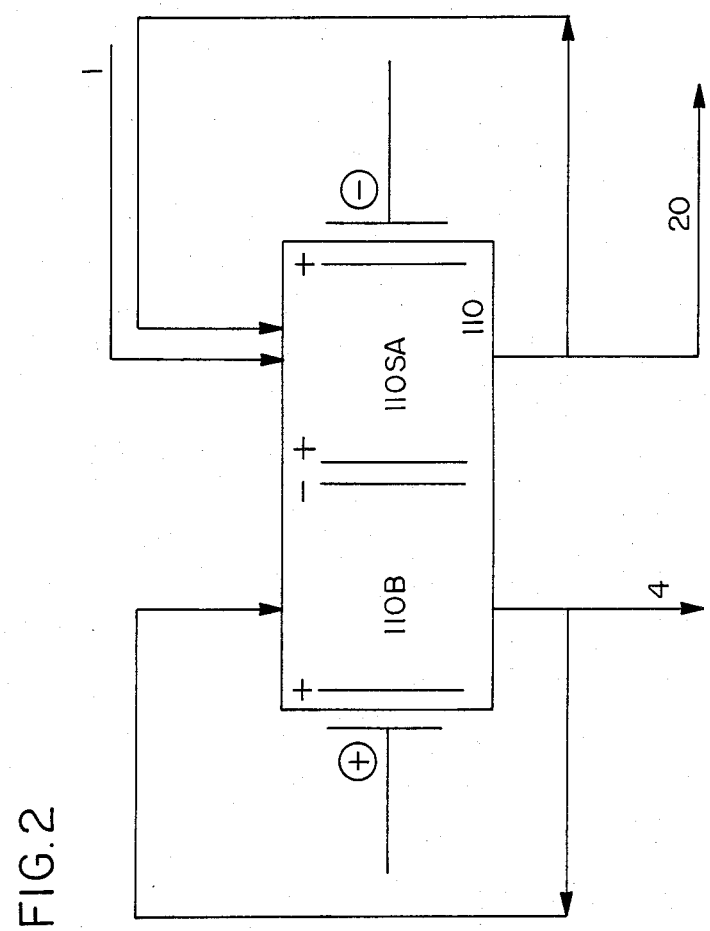

The process described above and illustrated in FIG. 1 may be modified by substitution of a two zone cell, shown in FIG. 2, for the preferred three zone cell of FIG. 1. The two zone cell, designated as 110 in FIG. 2, is characterized by having a single zone 110SA for both the salt and acid. The single salt/acid zone 110SA is separated from the base zone by a bipolar membrane and is bounded on the cathode side by a cation-permeable membrane. The adjacent base zone 110B, on its anode side, is bounded by a cation-permeable membrane.

The two zone cell, with its single salt/acid zone 110SA, has a single effluent stream 20, an acidified, depleted brine flowstream, that corresponds to effluent streams 2 and 3 from the three zone cell shown in FIG. 1. A portion of effluent stream 20 is returned directly to the cell for reintroduction to the single salt/acid zone 110SA as shown in FIG. 2, and the balance is introduced into the reactor.

We claim:

1. A cyclic method for solution mining subterranean ore deposits of trona or nahcolite, which comprises
   (i) contacting a subterranean trona or nahcolite ore deposit with aqueous sodium hydroxide solvent, prepared from electrodialysis of a brine, to form aqueous sodium carbonate;
   (ii) withdrawing aqueous sodium carbonate mining solution from the region of the ore deposit, whereby soda ash may be recovered from the withdrawn mining solution;
   (iii) preparing aqueous sodium hydroxide solvent by electrodialyzing a recirculating aqueous sodium chloride brine stream in an electrodialysis cell to yield aqueous cell effluents containing sodium hydroxide, hydrogen chloride and depleted sodium chloride brine, said electrodialysis cell consisting of one or more electrodialysis unit cells containing an acid zone, a salt zone, and a base zone;
   (iv) employing the aqueous sodium hydroxide cell effluent as aqueous sodium hydroxide solvent for solution mining of the subterranean ore deposit;
   (v) neutralizing the aqueous hydrogen chloride cell effluent with aqueous sodium carbonate; and
   (vi) introducing the neutralized aqueous hydrogen chloride, along with the depleted aqueous sodium chloride cell effluent brine, into the electrodialysis cell, thereby providing for substantially complete recycle of the aqueous chloride in the operation of the electrodialysis cell.

2. The method of claim 1 wherein the recirculating aqueous sodium chloride brine stream is introduced into the salt zone, aqueous hydrogen chloride and aqueous sodium hydroxide are withdrawn from the acid and base zones, respectively, and a depleted recirculating aqueous sodium chloride brine stream is withdrawn from the salt zone.

3. The method of claim 1 wherein the aqueous sodium carbonate employed in the neutralization of hydrogen chloride effluent is withdrawn aqueous sodium carbonate mining solution or aqueous sodium carbonate liquor obtained from a soda ash recovery process.

4. The method of claim 1 wherein a portion of neutralized hydrogen chloride or depleted sodium chloride brine is discarded as purge, prior to their reintroduction into the electrodialysis cell, in an amount sufficient to maintain the concentrations of sodium chloride and anionic impurities in the recirculating brine stream at relatively constant levels.

5. An integrated cyclic method for solution mining subterranean trona ore deposits, which comprises
  (i) contacting a subterranean trona ore deposit with aqueous sodium hydroxide solvent, prepared from electrodialysis of a brine, to form aqueous sodium carbonate;
  (ii) withdrawing aqueous sodium carbonate mining solution from the region of the ore deposit;
  (iii) recovering soda ash from the withdrawn mining solution by evaporative crystallization of sodium carbonate monohydrate;
  (iv) preparing aqueous sodium hydroxide solvent by electrodialyzing a recirculating aqueous brine stream in an electrodialysis cell having three zones per cell unit, to yield, as cell effluents, aqueous sodium hydroxide, aqueous hydrogen chloride, and an aqueous brine stream depleted in sodium chloride;
  (v) employing the aqueous sodium hydroxide cell effluent as aqueous sodium hydroxide solvent for solution mining of the subterranean ore deposit;
  (vi) neutralizing the aqueous hydrogen chloride cell effluent with aqueous sodium carbonate liquor diverted from the crystallization operation of the soda ash recovery; and
  (vii) discarding a portion of neutralized hydrogen chloride or depleted sodium chloride brine as purge, prior to their reintroduction into the electrodialysis cell, in an amount sufficient to maintain the concentrations of sodium chloride and anionic impurities in the recirculating brine stream at relatively constant levels.

6. The method of claim 1 or 5 wherein the subterranean ore deposit is trona which also contains nahcolite.

7. The method of claim 1 or 5 wherein the subterranean ore deposit is contaminated with sodium chloride.

8. The method of claim 1 or 5 wherein the aqueous sodium hydroxide solvent contains from 1–15 wt % NaOH.

9. The method of claim 1 or 5 wherein the aqueous sodium hydroxide solvent contains from 3–10 wt % NaOH.

10. The method of claim 1 or 5 wherein the recirculating aqueous brine stream introduced into the electrodialysis cell contains from 2–30 wt % NaCl.

11. The method of claim 1 or 5 wherein the recirculating aqueous brine stream introduced into the electrodialysis cell contains from 5–20 wt % NaCl.

12. The method of claim 1 or 5 wherein the electrodialysis cell consists of a plurality of unit cells.

13. The method of claim 1 or 5 wherein carbon dioxide, generated during neutralization of the hydrogen chloride cell effluent with aqueous sodium carbonate, is recovered.

14. The method of claim 2 or 5 wherein the recirculating aqueous sodium chloride brine stream is introduced to the salt zone, aqueous hydrogen chloride and aqueous sodium hydroxide are withdrawn from the acid and base zones, respectively, and a depleted aqueous sodium chloride brine is withdrawn from the salt zone.

15. The method of claim 4 or 5 wherein the purge rate is adjusted to remove an amount of sodium chloride and anionic impurities corresponding to that introduced to the recirculating brine stream from neutralization of the hydrogen chloride with aqueous sodium carbonate.

* * * * *